United States Patent

Barnoin et al.

[11] Patent Number: 5,937,884
[45] Date of Patent: Aug. 17, 1999

[54] SOLENOID VALVE FOR REGULATING THE FLOW OF FLUIDS IN CIRCUITS, WITH SPECIAL APPLICATION TO GAS CIRCUITS

[75] Inventors: David Barnoin, Nice; Jacques Cutaya, Cagnes-sur-Mer, both of France

[73] Assignee: Ranco of Delaware, Wilmington, Del.

[21] Appl. No.: 08/792,080

[22] Filed: Jan. 31, 1997

[30] Foreign Application Priority Data

Feb. 15, 1996 [FR] France .................................. 96 02095

[51] Int. Cl.⁶ .................................................. F16K 31/06
[52] U.S. Cl. .......................... 137/1; 251/64; 251/129.05; 251/129.15
[58] Field of Search ......................... 251/129.05, 129.15, 251/64; 137/1

[56] References Cited

U.S. PATENT DOCUMENTS

| | | | |
|---|---|---|---|
| 2,853,659 | 9/1958 | Herion | 251/129.15 X |
| 3,379,214 | 4/1968 | Weinberg | 251/129.15 X |
| 3,476,128 | 11/1969 | Barker | 251/129.05 X |
| 4,341,241 | 7/1982 | Baker | 251/129.15 X |
| 4,409,580 | 10/1983 | Ishigaki | 251/129.15 X |
| 4,475,711 | 10/1984 | Rountry | 251/129.15 X |
| 4,546,795 | 10/1985 | Okamoto et al. | 251/129.05 X |
| 4,548,047 | 10/1985 | Hayashi et al. | 251/129.05 X |
| 4,681,142 | 7/1987 | Woeller et al. | 251/129.05 X |
| 4,901,974 | 2/1990 | Cook et al. | 251/129.05 X |
| 5,237,980 | 8/1993 | Gillier | 251/129.05 X |

*Primary Examiner*—John Rivell
*Attorney, Agent, or Firm*—Leydig, Voit & Mayer, Ltd

[57] ABSTRACT

A solenoid operated valve of the type intended to be operated with a constant frequency variable duty cycle electrical pulse signal. The valving member/armature has an elastomeric cap provided on one end which functions to close one face on a valve seat when the solenoid is de-energized and the opposite face functions to act as a limit stop for valving member movement in the opposite direction when the solenoid is energized.

16 Claims, 1 Drawing Sheet

SOLENOID VALVE FOR REGULATING THE FLOW OF FLUIDS IN CIRCUITS, WITH SPECIAL APPLICATION TO GAS CIRCUITS

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

This invention concerns a solenoid valve for regulating the flow of fluids in a circuit, with special application to gas circuits, more specifically a pulsed solenoid valve piloted by a square electrical signal with a variable cyclic ratio and a fixed or variable frequency, the output rate of the valve being proportional to the cyclic ratio. This flow-regulating solenoid valve has special application to gas-powered home appliances, such as cooking or heating appliances, where it controls the flow of gas to the burners.

Such flow-regulating solenoid valves in gas burner control applications must work at relatively high temperatures; furthermore, in the type of application mentioned above, they must be able to go through a large number of cycles, on the order of several hundred million. Silent operation is also desirable.

The foregoing objectives are not fully satisfied by known flow-regulating solenoid valves. Specifically, it should be noted that in known solenoid valves, the magnet-actuated moving assembly, which includes the cylindrical moving core, as well as an obturator which cooperates with a fixed seat, is in most cases relatively massive. This assembly moves back and forth at the frequency of the electrical pulses which pilot the solenoid valve; and, it produces noise-generating internal shocks in the course of operation. Specifically, a shock can occur each time the oscillating assembly reaches the end-position furthest from the fixed seat, when the moving core comes into direct, unabsorbed contact with its guide. In addition to unwanted noise, such shocks produce wear and tear of the solenoid valve, which shortens its useful life.

BRIEF SUMMARY OF THE INVENTION

The aim of this invention is to provide a flow-regulating solenoid valve for fluid circuits, with special application to gas circuits, which, despite its very simple structure, eliminates internal shocks and most of the operating noise, and thus offers increased reliability and useful life in addition to practically silent operation.

The object of the invention is a solenoid valve for regulating the flow of fluids in circuits, with special application to gas circuits. More specifically, it is a pulsed solenoid valve with a variable cyclic ratio, featuring a body with a fluid inlet port, a fluid exit port, and an internal chamber. One of the ports is connected to said chamber via a short channel, the exit end of which forms an annular seat. The valve also features an electromagnet with a coil and a fixed magnetic circuit mounted around a central guide with a cylindrically shaped recess which opens into the internal chamber. The recess houses a moving magnetic core, retracted by a return spring. One end of the moving magnetic core features a flap designed to cooperate with the annular seat. The solenoid valve is defined by the fact that one end-face of the flap, which is made of an elastic material, is more or less circular or annular in shape, and cooperates with the annular seat when the solenoid valve is closed; while the other annular end-face of the flap, facing in the opposite direction, abuts the wall of the internal chamber opposite the annular seat when the solenoid valve is in the open position.

Thus, a defining characteristic of the invention is that the end position of the moving core, which corresponds to the open position of the solenoid valve, is achieved by the stop of a part made of elastic material, i.e. the flap on the moving core, and not by the stop of rigid parts or by the return spring, as is usually the case. This eliminates shocks and noise, as well as excessive wear of the spring.

In a preferred embodiment of the invention, the central guide, in the recess of which the moving core glides, features an end flange attached to the body of the solenoid valve. This flange constitutes the boundary of the internal chamber mentioned above. The assembly is designed so that when the solenoid valve is closed, the annular end face of the flap stops against one of the faces of the central guide's end flange.

Further, it is advantageous to give the moving core of the flow-regulating solenoid valve according to the invention an elongated, roughly cylindrical shape, with one of its ends profiled as a head on which the flap is mounted and retained. Thus, the moving assembly is of limited mass.

The invention will be further clarified by the following description, which refers to the appended schematic drawing of an example of an embodiment of the flow-regulating solenoid valve for fluid circuits, with special application to gas circuits, where:

DETAILED DESCRIPTION OF THE INVENTION

Figure 1:
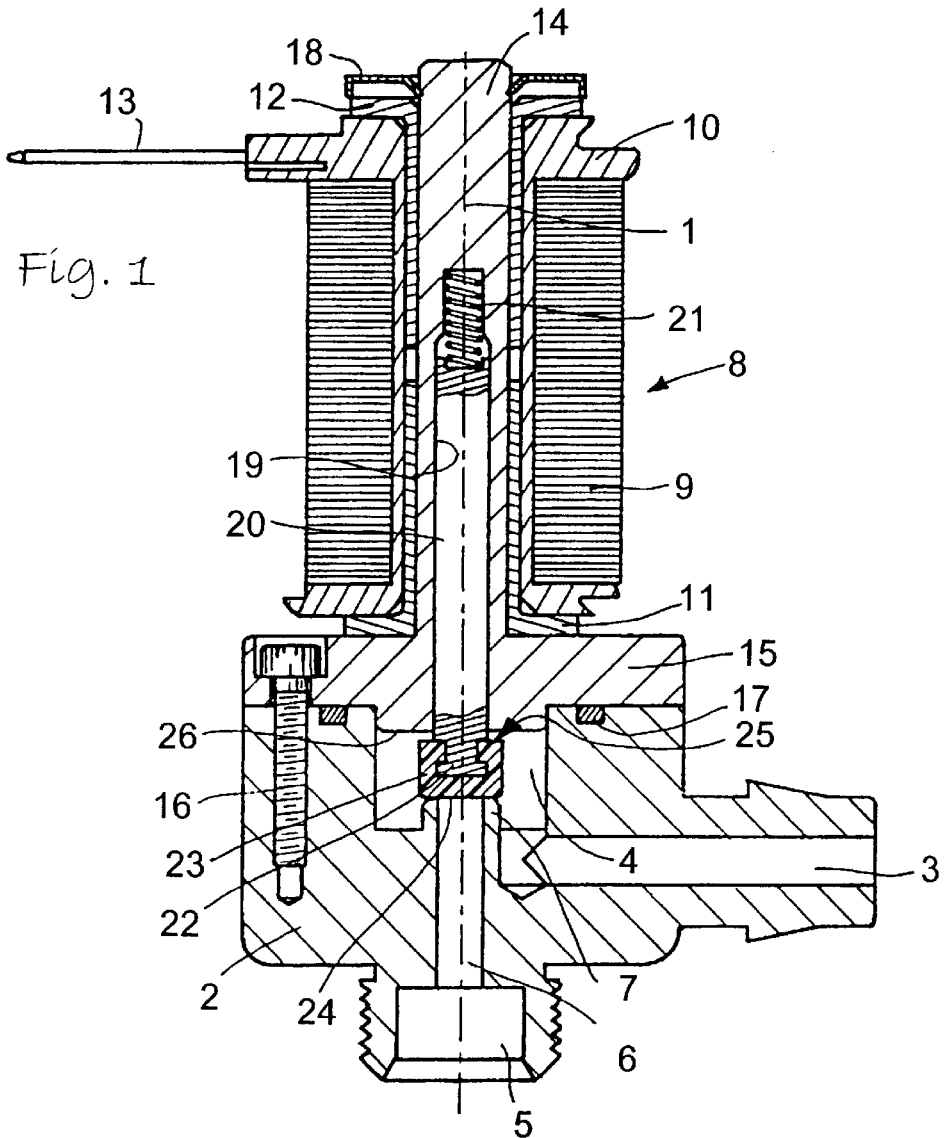
FIG. 1 is a general view, in longitudinal cross section, of a solenoid valve according to the invention.

FIG. 1 shows a flow-regulating solenoid valve for a gas circuit, with most of its components arranged along a central axis 1. The solenoid valve features a body 2, with a lateral gas inlet port 3, opening into internal chamber 4 of body 2, and an axial gas exit port 5. Exit port 5 is connected, via a short axial channel 6, to the center of internal chamber 4, and an annular seat 7 is formed at the point where channel 6 enters said internal chamber 4.

The solenoid valve electromagnet indicated generally at 8 is placed above the body 2 of the valve. This electromagnet features an excitation coil 9, wound around an insulating carcass or bobbin 10, which itself surrounds a fixed magnetic circuit constituted by two opposite tubular components, 11 and 12. Electrical terminals 13, which power excitation coil 9, are mounted on carcass or bobbin 10.

The assembly constituted by coil 9, 10 and magnetic circuit 11, 12 is arranged around a central guide 14, one end of which is enlarged into an end flange 15 which rests against body 2 and is attached to it by screws 16. An annular gasket or seal ring 17 is inserted between the flange and the body. The other end of guide 14 features an elastic retaining ring 18, which rests against component 12 of the fixed magnetic circuit.

Guide 14 features, on part of its length, a cylindrical recess or bore 19 which opens into internal chamber 4, opposite annular seat 7. The moving magnetic core 20, which is of an elongated, roughly cylindrical shape, is mounted inside recess 19 of guide 14. A return spring 21, housed and compressed at the "bottom" or upper end of recess 19, pushes one end of moving core 20 toward body 2.

The other end of moving core 20 is located inside internal chamber 4, and is profiled in the shape of a head 22. Elastic flap 23 is mounted and retained on head 22 of moving core 20. The outside of flap 23 is of roughly cylindrical shape; thus, it has a circular end face 24 (facing toward annular seat 7), and, on the opposite side, an annular end face indicated generally at 25, turned toward one face 26 of end flange 15 of guide 14, with face 26 marking the boundary of internal chamber 4.

Figure 3:
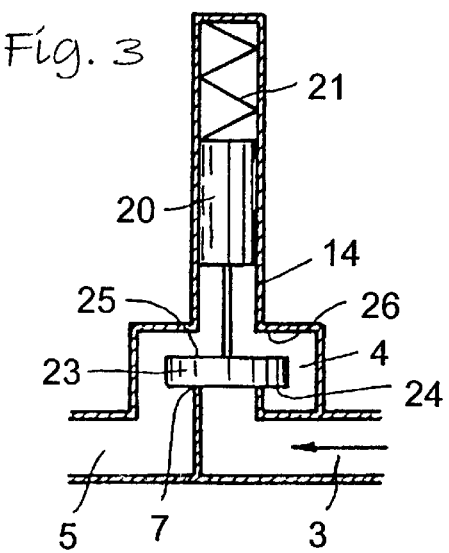
FIG. 3 is a skeleton diagram similar to FIG. 2, but shows the solenoid valve in the closed position.

When the solenoid valve is in the closed position (which is also its rest position), moving core 20 is pushed "back" or downward by return spring 21; and, the circular end face 24 of flap 23 forms a seal against annular seat 7. In this position, gas inlet port 3 and gas exit port 5 are completely isolated from each other (see FIGS. 1 and 3).

Figure 2:
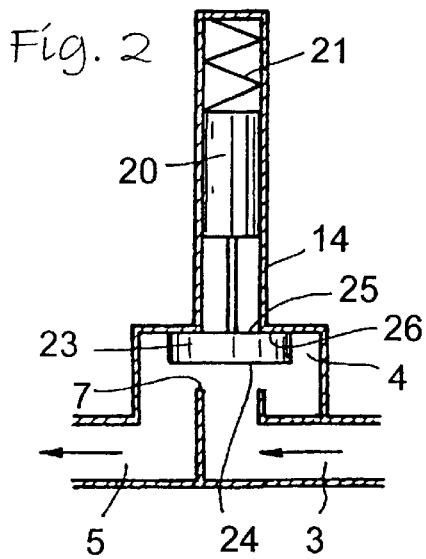
FIG. 2 is a skeleton diagram showing the mechanical operation of the solenoid valve of FIG. 1, in the open position.

When the solenoid valve is in the open position (FIG. 2), moving core 20, attracted by electromagnet 8, is more deeply drawn into recess 19, which further compresses return spring 21 and lifts flap 23 away from annular seat 7. In this position, gas inlet port 3 and gas exit port 5 communicate with each other via internal chamber 4.

An important characteristic of the solenoid valve according to the invention is the fact that, in the open position, end face 25 of flap 23 rests against face 26 of end flange 15 of guide 14, and there is no contact whatsoever between moving core 20 and the wall of recess 19 of guide 14.

When the flow-regulating solenoid valve is in operation, moving core 20 moves back and forth between the closed and open positions, cyclically and at a given frequency which depends on the electrical pulses sent to excitation coil 9. Specifically, such pulses can be of variable cyclical ratio or duty cycle (duration of each pulse/cycle period), while the frequency itself is fixed and of a value in the 20 to 25 Hz range, for instance. The cyclical ratio or duty cycle can also vary in a range of 0 to 100%; and, the rate of gas flow at the exit port of the solenoid valve is proportional to the value of the duty cycle or cyclical ratio, since said ratio is also that of the time during which the solenoid valve is opened over the period of the cycle.

As the moving core 20 moves back and forth between the closed and open positions, flap 23 alternates between stops against annular seat 7 (via its circular end face 24) and end flange 15 of guide 14 (via its annular end face 25). Since flap 23 is made of synthetic rubber, it absorbs to a considerable extent the shocks produced by the moving assembly (moving core 20+flap 23) against both annular seat 7 and guide 14, thus eliminating noise. The severity of the impacts in this case are further weakened by the low mass of the mobile assembly actuated by electromagnet 8.

The scope of the invention is not limited to the single example of an embodiment of the flow-regulating solenoid valve which has been described above, but that it encompasses all possible variants embodiments and applications which use the same principle. Specifically, changes might be made to the construction details of the valve, or to the materials used, or the same flow-regulating solenoid valve may be used in a liquid circuit, without leaving the scope of the invention.

We claim:

1. A solenoid operated valve assembly of the type operated by a fixed frequency variable width pulse electrical signal comprising:

(a) a coil surrounding tubular pole pieces and a valve guide with a moveable magnetic valve member moveably received therein;

(b) a resilient elastomeric cap disposed on one end of said valve member, said cap operable upon movement of the valve member in a first direction to close against a valve seat and upon movement of said valve member in a second direction opposite said first direction to open said valve seat and contact said guide, thereby limiting the movement of said valve member in said second direction, said cap providing sole contact in said second direction; and, (c) means biasing said valve member in said one direction, wherein said valve member is moved between said first and second positions upon operation of said coil with said variable width pulse signal.

2. A pulsed solenoid valve for use in gas circuits having a variable cylindrical ratio, comprising:

a valve body defining a first fluid port, a second fluid port, and an internal chamber, said first fluid port in gaseous communication with said second fluid port through said internal chamber, said first fluid port including an annular seat at an entrance to said internal chamber;

a central guide defining a cylindrical recess positioned to communicate with said internal chamber through an opening face thereon;

an electromagnet having a coil and a fixed magnetic circuit positioned in magnetic communication with said central guide;

a movable core positioned with said cylindrical recess, said core having a first end extending into said internal chamber and a second end;

a spring in compressive engagement with said second end of said core within said cylindrical recess; and an elastic flap positioned on said first end of said core having a first end face configured to cooperate with said annular seat and a second end face opposite said first end face; and wherein said first end face provides sealing engagement against said annular seat under force of said spring in a closed position, and wherein said second end face provides sole contact with said face of said internal chamber at said entrance to said opening face, said contact of said second end face to said opening face stops annular translation of said core upon energization of said electromagnet.

3. The valve of claim 2, wherein said electromagnetic comprises a plurality of windings positioned on a bobbin, and wherein said electromagnet and said electromagnetic is retained on said central guide by an elastic retaining ring.

4. The valve of claim 2, further comprising first and second tubular components interposed between said electromagnet and said central guide forming a fixed magnetic circuit.

5. The valve of claim 2, wherein said flap prevents annular contact of said core with said central guide.

6. The valve of claim 3, wherein said flap absorbs essentially all impact force to stop annular translation of said core within said cylindrical recess.

7. A solenoid valve, comprising:
- a valve body defining therein a first port, a second port, and an internal chamber therebetween, at least one of said first and said second port defining an annular seat at an entrance to said internal chamber;
- a central guide sealably attached to said valve body forming a face opposite said annular seat within said internal chamber, said central guide defining a bore therein communicating through said face with said internal chamber;
- an electromagnet positioned in magnetic communication with said central guide;
- a spring positioned within said bore at an end opposite said face;
- a member translatably positioned within said bore and having a first end extending through said face into said internal chamber and a second end in contact with said spring, said member including an elastic flap positioned on said end of said member, said member being configured to provide alternate contact between said seat and said face; and
- wherein said contact between said flap and said seat stops annular translation of said member in a first direction, and wherein said contact between said flap and said face stops annular translation of said member in a second direction.

8. The valve of claim 7, wherein said member is a magnetic core defining an annular end face on said first end, and wherein said elastic flap is to said annular end face, said elastic flap being configured at a first end to sealably engage said seat and at a second end to contact said face to prevent translation of said flap into said bore.

9. The valve of claim 7, wherein said electromagnetic comprises a plurality of windings positioned on a bobbin, and wherein said electromagnet and said electromagnetic is retained on said central guide by an elastic retaining ring.

10. The valve of claim 7, further comprising first and second tubular components interposed between said electromagnet and said central guide forming a fixed magnetic circuit.

11. The valve of claim 7, wherein said contact of said flap and said face prevents further annular contact in a second direction.

12. The valve of claim 7, wherein said flap prevents annular contact of said member with said central guide.

13. The valve of claim 7, wherein said flap absorbs essentially all impact force to stop annular translation of said member.

14. The valve of claim 7, further comprising a sealing ring interposed between said central guide and said valve body.

15. A method of reducing the acoustic energy resulting from the opening and closing of a solenoid valve having a core translatably positioned within a central guide, the core being used to open and close the valve, comprising the steps of:
- attaching an elastic flap on an end of the core to open and close the valve;
- translating the core in a first annular direction to open the valve;
- stopping the translating in the first annular direction by contacting the elastic flap on a face of the central guide.

16. The method of claim 15 wherein the valve further includes a valve seat, further comprising the steps of:
- translating the core in a second annular direction to close the valve;
- stopping the translating in the second annular direction by contacting the elastic flap on the valve seat.

* * * * *